United States Patent [19]
Risch et al.

[11] Patent Number: 5,911,023
[45] Date of Patent: Jun. 8, 1999

[54] POLYOLEFIN MATERIALS SUITABLE FOR OPTICAL FIBER CABLE COMPONENTS

[75] Inventors: Brian G. Risch; James D. Holder, both of Hickory, N.C.

[73] Assignee: Alcatel Alsthom Compagnie Generale d'Electricite, Paris, France

[21] Appl. No.: 08/891,978

[22] Filed: Jul. 10, 1997

[51] Int. Cl.[6] ................................................ G02B 6/44
[52] U.S. Cl. .......................... 385/100; 385/141; 525/68
[58] Field of Search ................................. 385/100, 109, 385/113, 126, 141

[56] References Cited

U.S. PATENT DOCUMENTS

| | | | |
|---|---|---|---|
| 4,832,443 | 5/1989 | Cameron et al. | 385/101 |
| 5,385,976 | 1/1995 | Furuta et al. | 525/68 |
| 5,561,729 | 10/1996 | Parris | 385/113 |
| 5,574,816 | 11/1996 | Yang et al. | 385/109 |
| 5,734,773 | 3/1998 | Teshima et al. | 385/126 |

*Primary Examiner*—John D. Lee
*Assistant Examiner*—Juliana K. Kang
*Attorney, Agent, or Firm*—Ware, Fressola, Van Der Sluys & Adolphson LLP

[57] ABSTRACT

Optical fiber cable components such as buffer tubes, filler rods, or jackets are produced using a thermoplastic polyolefin characterized by a high melt flow index. The use of material with a high melt flow index versus conventional "extrusion grade" materials which are characterized by a low melt flow index results in substantial improvements in buffer tube crystallinity and crystallization rates, improved buffer tube crush resistance, reduced post extrusion shrinkage, improved gel compatibility, and improved excess fiber length control. The advantages of using materials with a high melt flow index are most evident when processing thermoplastic materials such as nucleated copolymers of ethylene and propylene at high line speeds (shear rates) of over 50M/min.

25 Claims, 4 Drawing Sheets

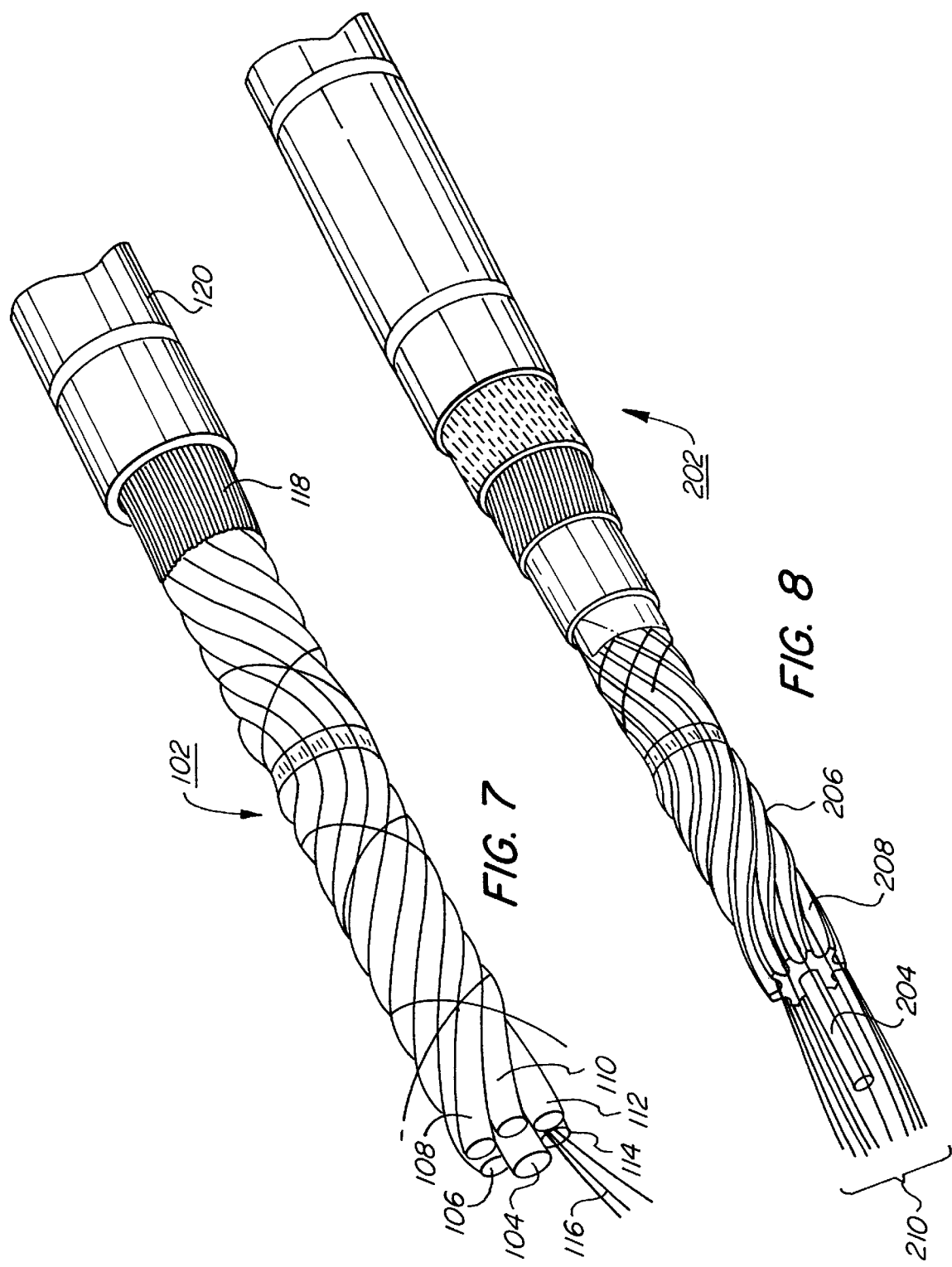

POLYOLEFIN MATERIALS SUITABLE FOR OPTICAL FIBER CABLE COMPONENTS

BACKGROUND OF THE INVENTION

1. Field of the Invention

The present invention relates to optical fiber cables and optical fiber cable components. More specifically, the present invention relates to processing thermoplastic polyolefins, such as polypropylene-polyethylene copolymers, to make optical fiber cable components.

2. Description of the Prior Art

Optical fiber cables have been in use in communications industries for a number of years to transmit information at very high rates over long distances. In an optical fiber cable the information is carried in the form of light signals through glass fibers with diameters on the order of 100 μm. These fibers are protected from the environment and external stresses by the cable structure.

In designing the cable structure it is important to ensure that process or construction induced stresses related to cable production do not interfere with optical fiber performance. The general trend in the industry is to increase rates of production to meet demand and increase profitability by increasing linespeeds on production equipment. For extruded components such as optical fiber buffer tubes, filler rods, cores, or jackets, higher line speeds may result in greater shear rates and higher orientation and residual stress in the finished product especially if an optimal material is not used.

Optical fiber cables may be classified into three general classifications based on cable structure: loose tube, monotube, and slotted core. In loose tube optical fiber cables, the optical fibers lie in a plurality of optical fiber buffer tubes which are generally filled with some type of water blocking compound such as a gel. These loose tube buffer tubes are stranded around a central member. In the loose tube design, in addition to the buffer tubes, filler rods may be stranded around the central member in order to provide symmetry in design for fiber counts lower than that of a full fiber count cable. These filler rods may be made of solid or cellular polymer.

In a slotted core optical fiber cable the optical fibers reside in channels or slots which are generally filled with a water-blocking gel. These channels form a helical path along the longitudinal axis of the cable.

In a monotube cable the optical fibers reside in a central tube which is generally filled with some type of waterblocking compound. In all of these structures, the buffer tube or core provides the primary structure to protect the thin optical fibers contained within. Typically the buffer tubes or core is jacketed with an additional protective layer. Additionally reinforcing yarns or fibers as well as waterblocking materials in the form of gels or hot melts, water swellable powders, yarns, or tapes, and/or corrugated armor may be placed between the jacket and the inner cable layers.

For each buffer tube design, it is important to choose material combinations which are compatible in terms of basic material properties and processability. Additionally, a choice of materials and processing conditions must be chosen which results in a cable which has high compression resistance and tensile strength combined with a low amount of residual stress. It is also important to choose a combination of materials and processing conditions which has minimal changes in dimensions as a function of time and temperature. It is desirable for a material to have a low coefficient of thermal expansion (CTE) to ensure that the fibers are not placed under stress as the cable endures the high and low temperature extremes encountered within its environment. Material and processing conditions which minimize process induced orientation are also desired since these will minimize the post extrusion relaxation and shrinkage of cable components. Post extrusion shrinkage of buffer tubes can lead to an increase in excess fiber length (a ratio of fiber length to actual tube length) which can, in turn, cause increases in fiber attenuation.

Fiber optic buffer tubes or cores have been primarily made from "engineering resins" such as polybutylene terepthalate (PBT), polycarbonate (PC), a polyamide such as nylon-12, or some layered combination of the above. Generally, these materials have been chosen due to their high modulus and low CTE relative to other polymers. These materials have disadvantages compared to polyolefin based buffer tubes such as nucleated polyethylene-propylene copolymer buffer tubes which include increased cost, decreased buffer tube flexibility, decreased hydrolytic stability, and more difficult processability.

Generally, polyolefins have not been used for buffer tube applications due to a combination of reduced modulus and other physical properties relative to the above described "engineering resins". These limitations included reduced modulus, decreased compatibility with waterblocking gels, and lower dimensional stability at high temperatures. However, polyolefin buffer tubes made of a nucleated copolymer of polyethylene and polypropylene have been used. See Yang, H. M., Holder, J. D., and McNutt, C. W., "Polypropylene-polyethylene Copolymer Buffer Tubes for Optical Fiber Cables and Method for Making the Same", U.S. Pat. No. 5,574,816. These materials have become useful for fiber optic buffer tube applications due to improvements in modulus, compression resistance, solvent compatibility and other properties brought about by the inclusion of a crystal nucleating agent in the polymer resin formulation. Since 1995, flexible polyolefin buffer tubes have become increasingly attractive from an application and installation standpoint due to greater ease in buffer tube access, handling and relative cost. See Adams, M., Holder, J., McNutt, C., Tatat, O., and Yang, H., "Buffer Tubes-The Next Generation", International Wire and Cable Symposium, 44th IWCS Proceedings, 1995, 16–21. Also, see Holder, J. and Power, R., Lightwave 1995. Increased demand for these materials has caused the necessity of increasing production capacity.

"Extrusion grade" materials of the prior art are generally characterized by a low Melt Flow Index. The Melt Flow Index (MFI) of a polymer is determined by measuring the amount of material which flows through an aperture of a fixed size during a fixed time period at a set temperature when placed under a fixed load. The melt flow index (MFI) is determined according to an ASTM Method such as D1238-57T5. This method determines MFI at a temperature of 230° C., with a total weight applied of 2160 g, a die diameter of 0.0825 in., and a die length of 0.315 in. A correlation between MFI and molecular weight for polypropylene according to this ASTM method has been determined and reported in Frank H. P., Polypropylene, Macdonald Technical and Scientific, London, 1968 and has been used to determine approximate molecular weights for the samples used in this study.

Generally, low MFI materials have a high degree of melt strength and good dimensional stability of the extruded profile after exiting; the extrusion die. Additionally, general trends have been observed correlating a higher molecular weight (low MFI) to improved mechanical properties of extruded parts. As a result, low MFI materials (materials with MFI<3) are generally recommended by polymer manufacturers and suppliers for extruded optical fiber cable components. A disadvantage of using low MFI materials is that due to high melt viscosities these materials develop processing difficulties at the high shear rates associated with high linespeeds. Among the processing difficulties which may be associated with these materials is increased viscous heating of the polymer melt, process induced orientation, and decreased crystallization rates.

Each process has with it a set of process conditions which establish the criteria for optimal material properties. Within an industry material choices are made based on requirements based on process conditions and product end use. Polypropylene has been used extensively in the textile industry for much longer than in the optical fiber industry and extensive research has been undertaken to investigate the effects of molecular weight (MFI) and molecular weight distribution in relation to polypropylene processing in the field of fiber spinning.

Spruiell and coworkers have done extensive work investigating the effects of molecular weight, molecular weight distribution, and processing conditions on the processing of polypropylene filaments. See Misra, S., Lu, F. M., Spruiell, J. E., and Richeson, G. C., J. Appl. Polym. Sci. 1995, Vol. 56, pgs. 1761–79; Lu, F. M. and Spruiell, J. E., J. Appl. Polym. Sci. 1993, Vol. 49, pgs 623–31; Lu, F. M. and Spruiell, J. E., J. Appl. Polym. Sci. 1987, Vol. 34, pgs 1541–56; and Lu, F. M. and Spruiell, J. E., J. Appl. Polym. Sci. 1987, Vol. 34, pgs 1521–39. In these studies, it was found that under the processing conditions encountered during fiber spinning, increased crystallinity, modulus, and tensile strength were observed for non-nucleated polypropylenes as a function of decreasing MFI, increasing molecular weight. This trend was attributed to increased molecular orientation while processing higher molecular weight (lower MFI polypropylenes) and subsequent strain induced crystallization occurring during processing. Experiments at increased line speeds and draw ratio verified this hypothesis. Comparisons were also made between nucleated and non-nucleated polypropylenes as well as between a propylene homopolymer and an ethylene-propylene copolymer. See Bodaghi, H., Spruiell, J. E., and White, J. L., Int. Polym. Process 1988, Vol. 3, pgs. 100–112. The copolymer was similar to the non-nucleated version of the material which is the subject of this invention. Under the high shear rates generally associated with optimal polypropylene fiber performance, the effect of a nucleating agent on fiber properties was found to be insubstantial. However, at lower shear rates fiber tenacity is reduced by the addition of a nucleating agent although crystallinity is modestly increased. The effect of copolymerization of polypropylene with polyethylene was found to decrease crystallinity and the rate of crystallization substantially.

SUMMARY OF THE INVENTION

The present invention is designed to overcome the limitations encountered in processing polyolefin based optical fiber cable components that are attendant upon the use of materials in the MFI range suggested by the prior art. More specifically, this invention specifies a range of MFI values, for which processability as well as mechanical and chemical properties are optimized specifically for processes related to the production of optical fiber cables and cable components. By specifying the optimal range of MFI values as a function of processing linespeed and shear rate, this invention allows maximization of the inherent chemical properties of the materials of the prior art while optimizing processability and allowing an increase in production speeds for fiber optic cables and cable components.

The method of this invention may be used to fabricate polyolefin optical fiber cable components with improved strength and compression resistance, reduced shrinkage, reduced process induced orientation, increased crystallinity, and increased solvent resistance combined with improved processability. According to the method of the present invention, a fiber optic cable component is manufactured from a polyolefin characterized by an MFI selected in an optimal range which is generally higher than that specified for "extrusion grade" materials by polymer manufacturers. More specifically, the optimal MFI index range is determined to be greater than about 3 and less than about 24. Higher MFI materials are specified to be better suited for processing at higher shear rates and processing line speeds.

It is the object of the present invention to provide a polyolefin fiber optic cable component with improved strength and compression resistance, reduced shrinkage, reduced process induced orientation, increased crystallinity, and increased solvent resistance combined with improved processability. The invention will be disclosed in greater detail in the following detailed description and through examples accompanied by the following drawings.

BRIEF DESCRIPTION OF THE DRAWINGS

The drawings, which are not drawn to scale, include:

FIG. 7, which is a broken perspective view, showing an optical fiber cable containing a plurality of buffer tubes made according to the present invention for optical fibers wound around a central structural member in a reverse oscillating helical lay and a protective outer jacket; and FIG. 8, which is a broken perspective view, showing an optical fiber cable containing a slotted core made according to the present invention having a plurality of reversing helical slots.

DETAILED DESCRIPTION OF THE PRESENT INVENTION

Figure 1:
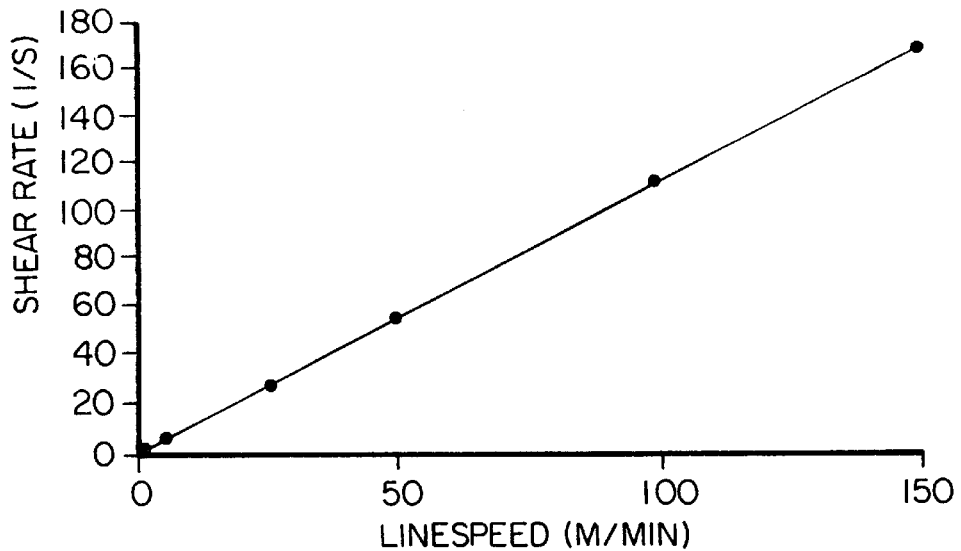
FIG. 1, which is a graph of the relation of shear rate to buffer tube line speed for 0.118" fiber optic buffer tubes.

According to the present invention, high melt flow polyolefin materials are used to manufacture optical fiber cable components such as buffer tubes, cores, filler rods, and jackets. The polyolefin materials may be from polymers of polyethylene and polypropylene, a copolymer of propylene and ethylene, or a terpolymer that includes propylene and ethylene. When the polyolefin is a polypropylene homopolymer, the homopolymer may have a polymer chain microstructure that is predominately isotactic. Suitable polyethylene homopolymers include high density polyethylene, medium density polyethylene, low density polyethylene and linear low density polyethylene (LLDPE). This polyolefin material may or may not contain a crystalline nucleating agent such as a salt of an aliphatic monobasic acid, a salt of an aliphatic dibasic acid, a salt of an arylalkyl acid, sodium succinate, sodium gluterate, sodium caproate, an alkali metal salt of an aromatic carboxylic acid, an aluminum salt of an aromatic carboxylic acid, an alkali metal salt of an alicyclic carboxylic acid and an aluminum salt of an alicyclic carboxylic acid, sodium benzoate, sodium stearate and potassium benzoate. This polyolefin material may also contain organic or inorganic fillers such as talc, calcium carbonate, or carbon black calcium carbonate, mica, silica, and kaolin. This polyolefin optical fiber cable component material may also contain chemical additives such as stabilizers, plasticizers, or colorants to otherwise modify or enhance properties.

According to the present invention polyolefin optical fiber cable components with enhanced processability, chemical, and mechanical properties can be extruded using any well known extrusion process, by using high melt flow polyolefins with a Melt Flow Index (MFI) that is greater than about 3. More specifically, the processability and mechanical properties of these polyolefin optical fiber cable materials are more stable during processing at linespeeds above 50 m/min with materials which have MFI in excess of about 3. Additionally, it has been found that increasing the MFI of the polyolefin to levels of about 24 gives an increase in processability for line speeds above 150 m/min, but gives no additional increase in initial crystallinity.

One embodiment of the current invention is a material suitable for extrusion into optical fiber cable components. The material comprises a nucleated polypropylene-ethylene copolymer with an MFI in the range about 3 to 24, having approximately 2–30 weight percent ethylene units in the chemical structure. Also, about 0.05 to 1.0 weight percent of a nucleating agent such as sodium benzoate may be included in this material to increase the rate of crystallization or crystallinity or to enhance optical clarity.

Another embodiment of the current invention is a second material suitable for the formation of optical fiber cable components by extrusion. This material comprises a polyethylene homopolymer with an MFI in the range of about 3 to 24. Also, approximately 0.05 to 1.0 weight percent of a nucleating agent such as sodium benzoate may be added to increase the rate of crystallization or crystallinity of this material as well as to enhance optical clarity. Other chemical additives such as ultraviolet or thermal stabilizers may also included in the composition. Additionally 0–40% filler material may be disbursed within.

Still another embodiment of the current invention is a third material suitable for the formation of optical fiber cable components by extrusion. This third material comprises a polypropylene homopolymer with MFI in the range of about 3 to 24. About 0.05 to 1.0 weight percent of a nucleating agent such as sodium benzoate may be added to increase the rate of crystallization or crystallinity of this material as well as to enhance optical clarity. Other chemical additives such as ultraviolet or thermal stabilizers may also included in the composition. Additionally 0–40% filler material may be disbursed within.

Other embodiments of this invention may include polyolefin copolymers or terpolymers not explicitly described above or any combination of the above materials in terms of a polymer alloy or blend which has rheological properties which can be characterized by a MFI in the range of about 3 to 24.

More particularly, in a first example, a TA 910 differential scanning calorimeter (DSC) made by T.A. Instruments, Inc. was used for crystallization experiments, and to determine heats of melting for polypropylene-ethylene copolymers which were used to produce optical fiber buffer tubes and filler rods. The DSC was equipped with an autocooler. The temperature of the peak of the crystallization exotherm upon cooling, $T_c^{max}$, was determined by cooling the polymer from the melt at 10° C./min. after being equilibrated at 230° C. for 4 minutes. Crystallization peaks located at higher temperatures, smaller undercoolings, indicate more rapid crystallization. The area under the crystallization peak is the heat of crystallization. The heat of crystallization is proportional to the level of crystallinity that the material develops.

Differential Scanning Calorimetry (DSC), was used to determine crystallization rates by $T_c^{max}$ experiments. The data is summarized in Table 1.

TABLE 1

Summary of DSC Crystallization Experiments

| MFI | Nucleated? | $T_c^{max}$ (° C.) | Crystallization Time to Peak |
|---|---|---|---|
| (MFI = 0.5) | Yes (0.3%) | 129.9° | 601s |
| (MFI = 2.5) | Yes (0.3%) | 134.5° C. | 573s |
| (MFI = 5.9) | Yes (0.3%) | 135.2° C. | 569s |
| (MFI = 24) | Yes (0.3%) | 135.5° C. | 567s |
| (MFI = 1.8) | Yes (ca. 0.8%) | 121.9° C. | 649s |
| (MFI = 3.8) | Yes (0.8%) | 125.6° C. | 626s |
| (MFI = 1.8) | No | 105.6° C. | 746s |
| (MFI = 3.8) | No | 113.9° C. | 697s |

The results of the crystallization experiments indicate that the addition of a nucleating agent increases the rate of crystallization. The non-nucleated material with the lowest MFI exhibited the slowest crystallization behavior. When comparing otherwise identical nucleated and non-nucleated materials with MFI=3.8 an decrease in crystallization time of 71 seconds is observed. For otherwise identical materials, increasing MFI was found to increase rates of crystallization if the content of nucleating agent was kept constant; however, the effect of varying the nucleating agent content from 0.08% to 0.30% while keeping ethylene content and molecular weight in the same range, was found to increase the rate of crystallization. Regardless of the presence or absence of nucleating agent, an increase in MFI above the range of 0 to 2 typically designated as "extrusion grade" material by polymer suppliers, resulted in an increase in crystallization rates. Generally, an increased rate of crystallization results in attainment of dimensional stability and better mechanical properties more rapidly. Additionally, increased crystallization rates can result in better control of fiber lengths in optical fiber buffer tubes. Further illustration of these relationships for optical fiber cable component applications will be illustrated in the following examples.

In a second example, optical fiber buffer tubes with a tube diameter of 0.118" and a wall thickness of 0.023" were extruded on a Nokia-Maileffer 45 mm single screw extruder, a Nokia-Maileffer model 4/6 crosshead using a screen pack of 20/40/80 mesh, and a screw having double flights in its feed section, double barriers in its metering section, a length to diameter ratio of 25:1, and a compression ratio of 2 to 1.

A plot of calculated shear rate vs. line speed for the 0.118" buffer tubes produced is shown in FIG. 1. These calculations were made based on a die I.D. of 0.375", tip O.D. of 0.190", tube I.D. of 0.072", draw down ration (DDR)=11.96, and draw ratio balance (DRB)=1.20. The following equations specified in Michaeli, W., Extrusion Dies for Plastic and Rubber: Design and Engineering Computations, Hanser, N.Y., 1992, can be used to predict the shear rates for circular slit dies:

$$\dot{\gamma} = \pi \frac{\bar{v}_z}{R} \text{ where } \bar{R} = \left[1 + k^2 + \frac{1-k^2}{\ln(k)}\right]^{1/2} ; k = \frac{R_i}{R_o}.$$

Where $\dot{\gamma}$ is the average shear rate, $R_o$ is the die I.D., $R_i$ is the tip O. D., and $\bar{v}_z$ is the average velocity through the die which can be calculated from the pressure loss through the die, the viscosity of the material and the geometric configuration of the die or, in our case much more simply by the linespeed and DDR:

$$\bar{v}_z = \text{linespeed} \div \frac{A_{Die}}{A_{Tube}} \equiv \frac{\text{linespeed}}{DDR}. \quad (2)$$

Buffer tubes were produced with nucleated polypropylene-ethylene copolymers with varying MFI on the extrusion line described above at linespeeds from 25 m/min to 150 m/min in order to determine the effects of linespeed and the corresponding shear rate on the properties of the resulting buffer tubes.

Figure 2:
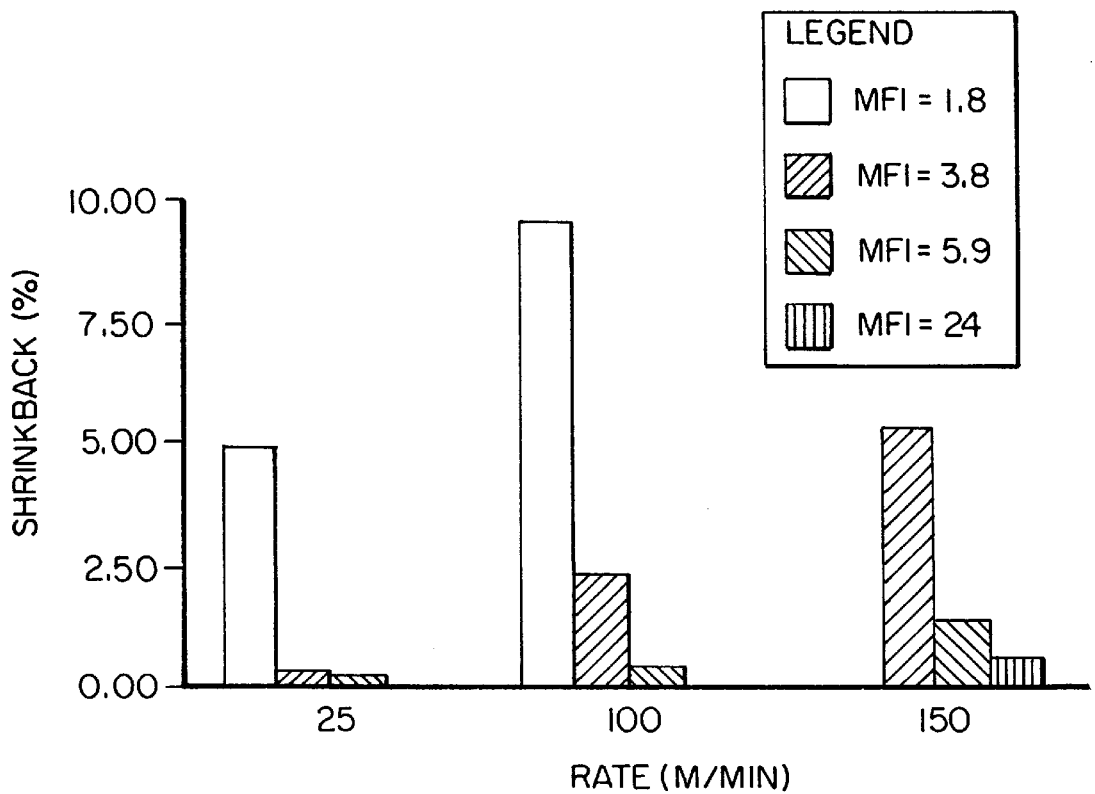
FIG. 2, which is a graph of the relation of shrinkage after 10 min. at 165° C. for buffer tubes as a function of MFI and linespeed for 0.118" buffer tubes.

Higher shear rates are known to induce molecular orientation during processing of polymers especially those with higher molecular weights, low MFI. The use of lower molecular weight materials can give advantages in terms of reducing molecular orientation in optical fiber cable components. The level of molecular orientation retained in optical fiber buffer tubes can be determined by a shrinkback experiment which measures buffer tube shrinkage at an elevated temperature. At the elevated temperature, molecular orientation that was locked into place during processing relaxes and results in buffer tube shrinkage. Shrinkback experiments were performed on buffer tubes cut to 25 cm in length. Any fibers within the tubes were removed prior to testing. Experiments were performed in an oven equilibrated at 165° C., a temperature where the shrink-back effect was maximized and the tubes were still not hot enough to melt. The tubes were placed on Teflon coated pans so that the shrinkback was not impeded by frictional effects. All samples were allowed to cool to room temperature before post shrinkback dimensions were recorded. The amount of shrinkback recorded was the lengthwise dimensional change in the tube after heating for 10 minutes at 165° C. At this temperature all measurable shrinkage occurred within the first ten minutes of testing. The results of buffer tube shrinkage experiments are summarized in FIG. 2. From the data presented in FIG. 2, it is evident that the use of higher MFI materials results in a reduction in process induced orientation especially at high line speeds.

Figure 3:
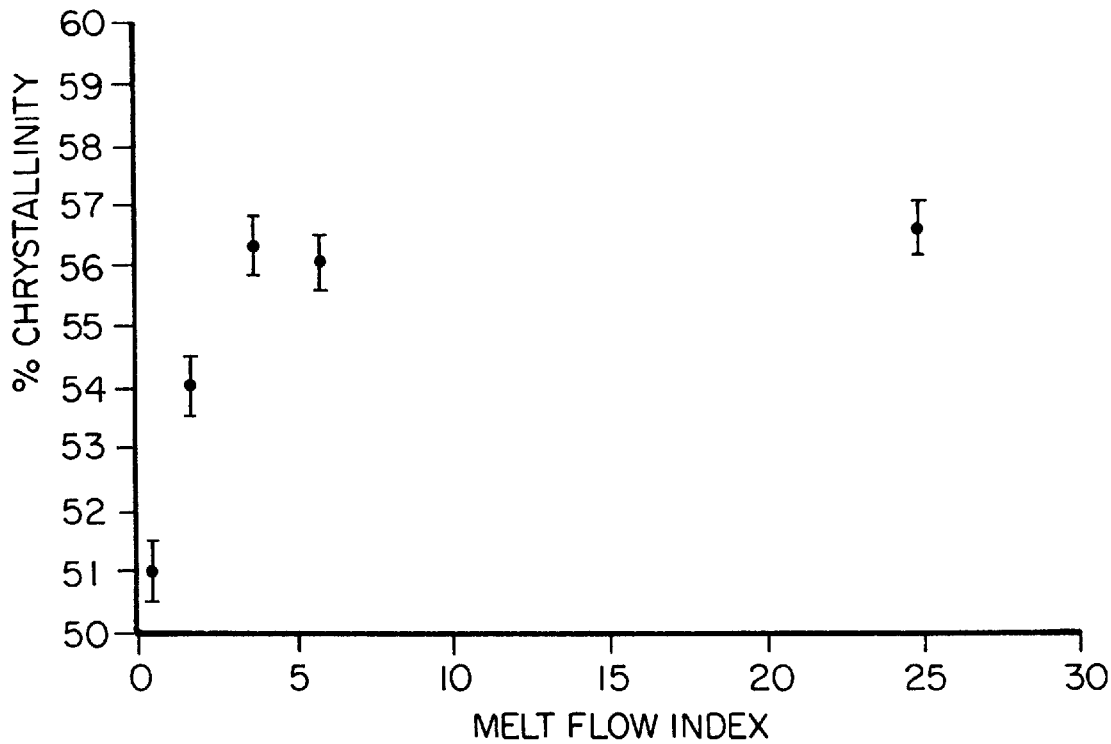
FIG. 3, which is a graph of crystallinity as a function of MFI for 0.118" polyethylene-propylene copolymer buffer tubes processed at 100 m/min.

FIG. 3 illustrates the crystallinity of nucleated polyethylene-propylene copolymer buffer tubes determined by density approximately 1 week after extrusion, for materials with varying MFI values. As evident from a review of FIG. 3, the materials with a higher MFI were characterized by a more rapid development of a higher level of crystallinity. These results are consistent with the DSC results which also indicated more rapid crystallization. Heats of fusion measured by DSC which are proportional to the level of crystallinity were also higher for materials with higher MFI. While keeping MFI constant, samples which contained a nucleating agent also showed a higher level of crystallinity.

Figure 4:
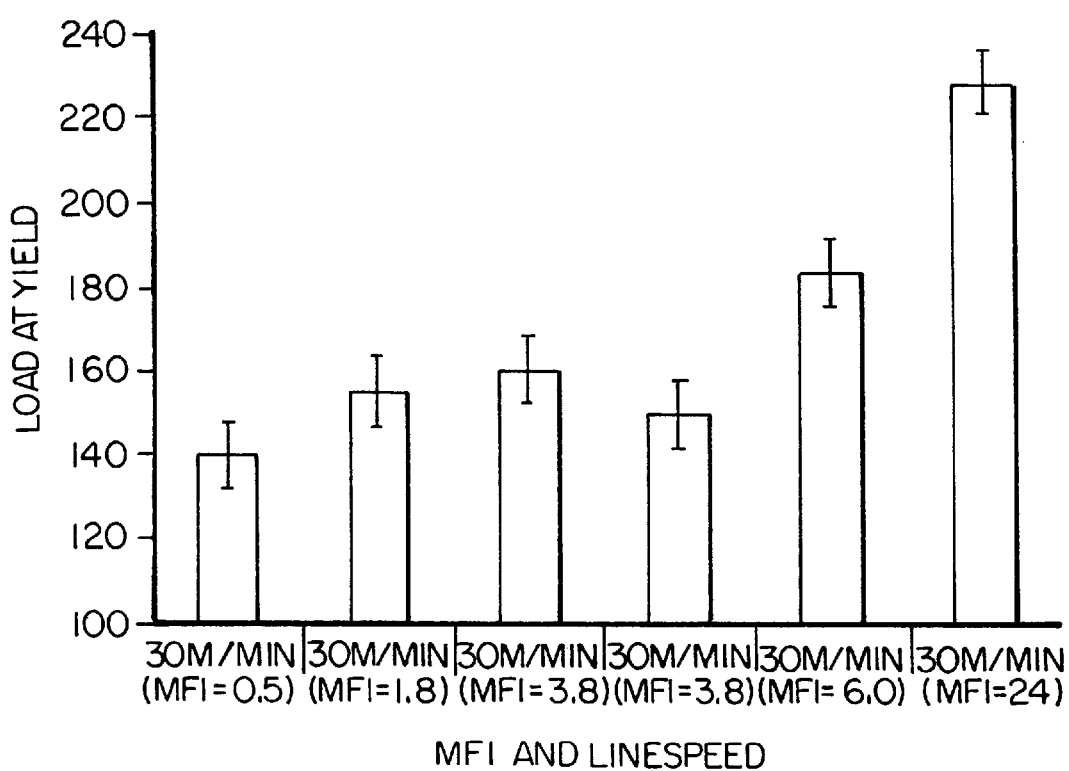
FIG. 4, which is a graph of the relation of compression resistance for 0.1118" nucleated polyethylene-propylene copolymer buffer tubes as a function of MFI and linespeed.

Buffer tube and cable crush resistance was determined using an Instron model 4468 mechanical tester equipped with a compression cage which crushed tubes between two 4" parallel plates. Tubes for crush resistance testing were cut into 7" lengths prior to testing. A crosshead speed of 0.05 inch/min was used. FIG. 4 illustrates the compressive load at yield for buffer tubes produced at different linespeeds and with varying MFI. The results illustrated in FIG. 4 combined with the results illustrated in FIGS. 2 and 3 indicate that the increased crystallinity and the reduced level of molecular orientation in the machine direction resulting from the use of high MFI impact polypropylene copolymer resulted in a significant improvement in buffer tube compression resistance.

Figure 5:
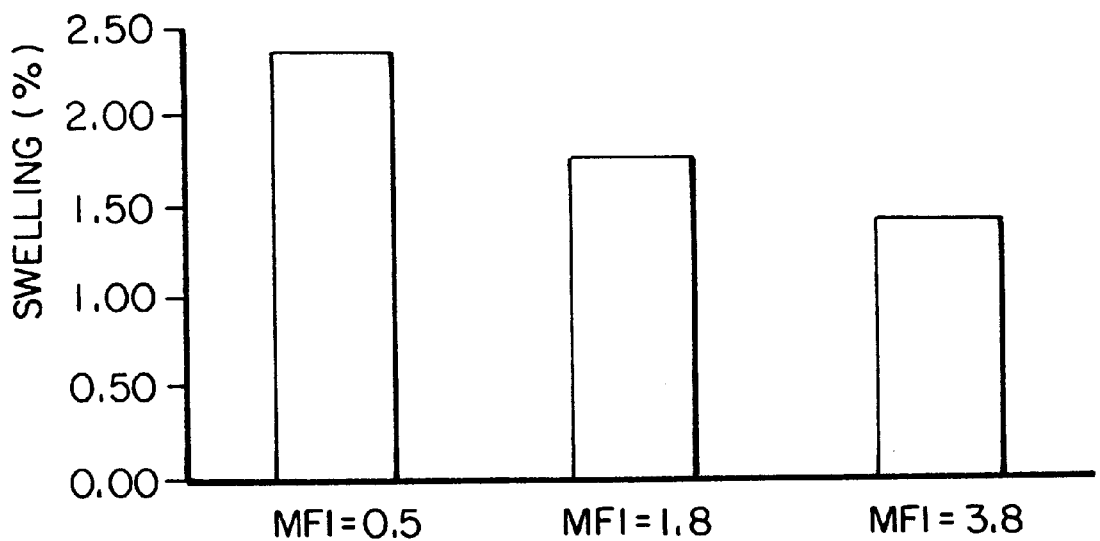
FIG. 5, which is a graph of the relation of absorption of waterblocking gel as a function of MFI.

Another important material property for optical fiber cable applications is solvent resistance. Higher levels of crystallinity are generally associated with improved solvent resistance for polymeric materials. Gel compatibility was determined by measuring the mass uptake, or swelling, of samples immersed in a cable waterblocking gel at 85° C. The results of gel compatibility tests are plotted as a function of MFI in FIG. 5. It is evident from the results that the gel compatibility is dramatically improved by selection of a higher MFI material. The improvement in gel compatibility is attributed to the increase in crystallinity for the higher MFI materials.

The advantage of using high MFI materials for high speed cable production technique is not limited in scope to optical fiber buffer tube applications. Advantages similar to those illustrated in FIGS. 1 through 5 may be obtained by using high MFI polyolefin materials in the production of other cable components such as jackets or filler rods. Filler rods were made on an extrusion line similar to that described earlier. These filler rods were produced at a linespeed of 600 m/min and foamed to 89% of the bulk density of the starting material pellets by addition of an Azodicarbonamide chemical blowing agent. The polyolefin base materials were High Density Polyethylene (HDPE) with an MFI determined according to ASTM-1238-90b as 0.78 g/10 min. and an impact modified polypropylene ethylene copolymer (i-PP) with a MFI=3.76 determined according to ASTM D1238-90b. Since the ASTM methods described above call for different measurement temperatures, 190° C. for HDPE and 230° C. for polypropylene, the MFI for the HDPE was also measured at 230° C. At 230° C. the MFI for the HDPE sample was determined to be 1.39 g/10 min. In both cases the MFI for the HDPE sample was determined to be substantially less than that for the i-PP sample. Table 2 summarizes the data for characteristics of these filler rods. The data from Table 2 illustrates that a relative density of 0.888 was achieved for the higher MFI material with the addition of 0.13 lb/km of blowing agent compared to 0.900 with the HDPE material with MFI=0.78 and 0.26 lb/km of chemical blowing agent added. It is obvious from this data that choice of the lower MFI material allows more effective use of the chemical blowing agent.

TABLE 2

Characteristics of Foamed Polyolefin Rods.

| Base Material & MFI | Chemical Blowing Agent Added | Starting Density | Final Density | Relative Density |
|---|---|---|---|---|
| HDPE (0.78 g/10 min.) | 0.26 lb/km | 0.946 g/cc | 0.851 g/cc | 0.900 |
| i-PP (3.76 g/10 min.) | 0.13 lb/km | 0.905 g/cc | 0.804 g/cc | 0.888 |

Table 3 summarizes the mechanical properties of the extruded filler rods. Buffer tube tensile load at yield and elongation was determined using an Instron model 4468 mechanical tester. A gauge length of 3.5" was used with a crosshead speed of 1.4 in/min. For all samples of the higher MFI copolymer of propylene and ethylene, the mechanical tester reached its limits in extension before the sample broke. The data from tables 2 and 3 illustrate that a choice of a lower melt flow index polyolefins for optical fiber cable filler rods results in more effective use of base polymer and blowing agent as well as improvements in mechanical properties.

TABLE 3

Mechanical Properties of Foamed Polyolefin Rods.

| Base Material & MFI | Density | Crush Resistance | Elongation to Break | Tensile Load at Yield |
|---|---|---|---|---|
| HDPE (0.78 g/10 min.) | 0.851 g/cc | 600 lbs | 300% | 25 lbs |
| i-PP (3.76 g/10 min.) | 0.804 g/cc | 700 lbs | >530% | 34 lbs |

Reliability of cable components over long time periods and under extreme environmental conditions is an important consideration when selecting materials for optical fiber cable applications. In this regard, it is desirable that cable components undergo a minimum of shrinkage during the lifetime of a cable or during testing. Bellcore specification GR-20 outlines several testing requirements for optical fiber cables and cable components. Among the requirements set forth in Bellcore GR-20 is a heat aging test at 85° C. for one week. Table 4 illustrates post extrusion shrinkage measured on 18" specimens for filler rods during an accelerated aging test at 85° C. for 1 week. It is evident from the shrinkage data, that use of the lower MFI material, and the resulting reduction in processed induced orientation leads to a significant reduction in post extrusion shrinkage.

TABLE 4

Post Extrusion Shrinkage During Aging Test at 85° C.

| Base Material & MFI | Shrinkage 48 Hrs. | Shrinkage 120 Hrs. | Shrinkage 168 Hrs. |
|---|---|---|---|
| HDPE (0.78 g/10 min.) | 1.30% | 1.39% | 1.4% |
| i-PP (3.76 g/10 min.) | 0.77% | 0.87% | 0.9% |

With the increased crystallization rates and reduced post extrusion shrinkage demonstrated in the examples contained in this disclosure, it is possible to achieve better control of excess fiber length in optical fiber buffer tubes as well as cable structures. Better control of fiber excess length in buffer tube and cable structures is a significant advantage which materials with the higher range of MFI values described in this disclosure offer over the cable materials of the prior art.

Figure 6:
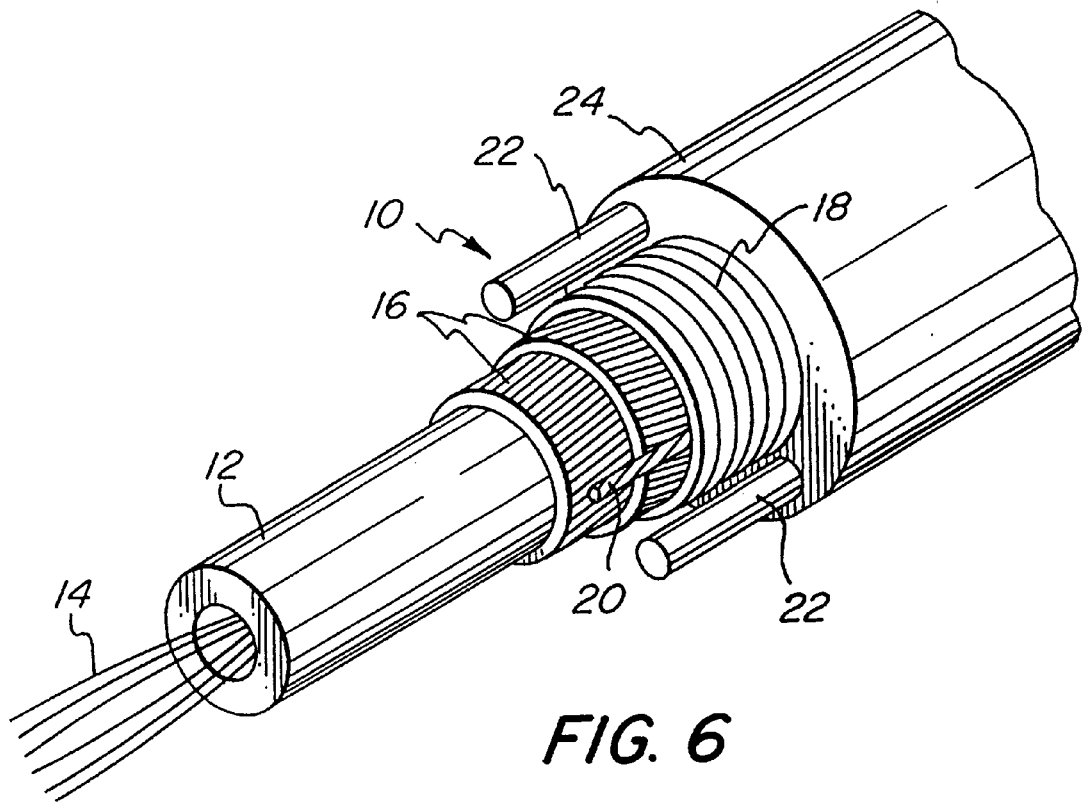
FIG. 6, which is a perspective cutaway section of a typical monotube optical fiber cable having a buffer tube made according to the present invention.
Figure 3:
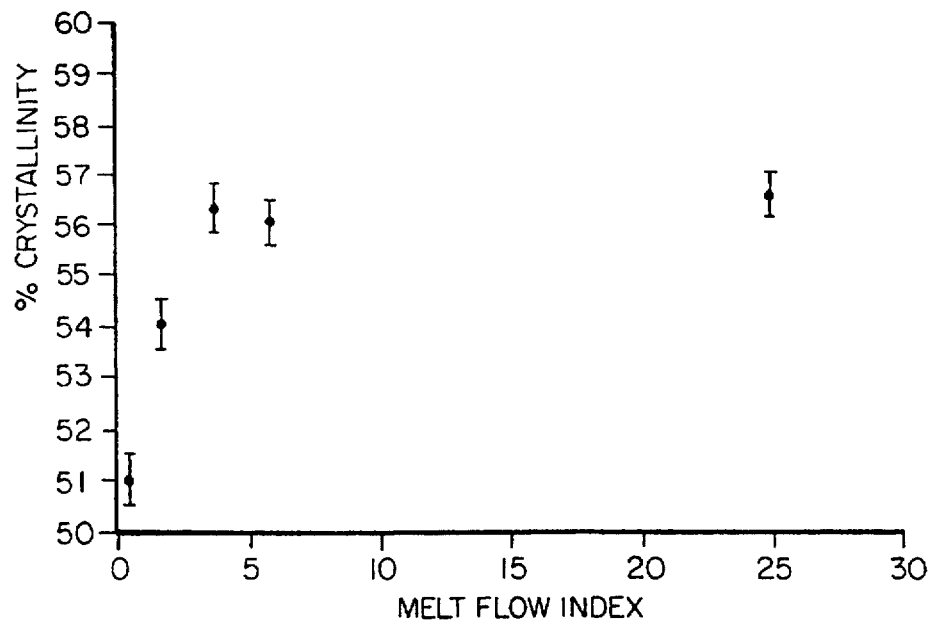
Figure 4:
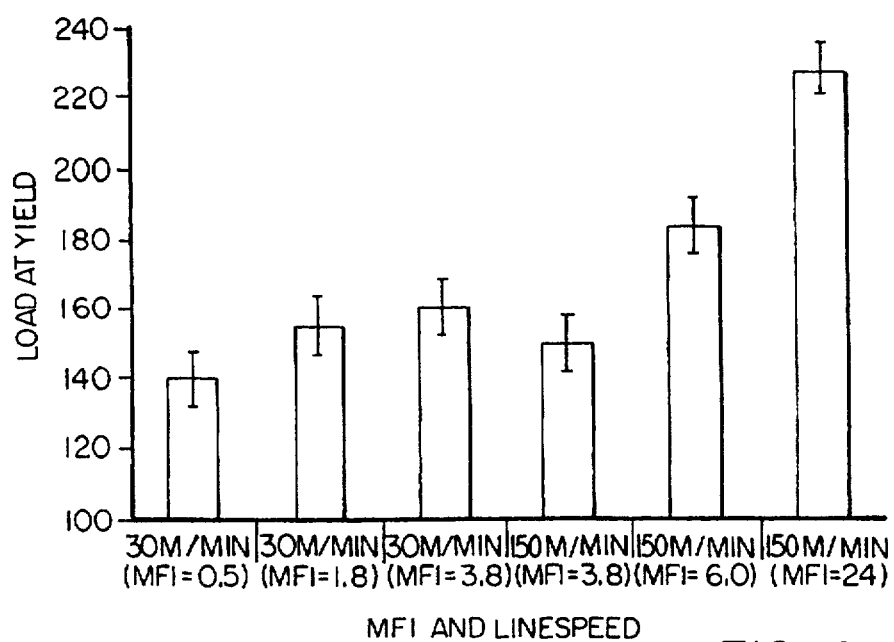

Referring to FIG. 6, therein is illustrated a monotube optical fiber cable as generally indicated by the numeral 10 incorporating the present invention. This cable structure 10 has a single large, gel-filled buffer or core tube 12 made from a polyolefin material having a high MFI in accordance with the present invention. The gel in the buffer tube is a thixotropic, water blockable gel such as mineral gels, petroleum gels. The gel filled buffer tube 12 contains a plurality of optical fibers 14. Radial strength yarns 16 made of either aramid, polyethylene, polyester or fiberglass materials are contra-helically stranded around the buffer tube 12 and impregnated with filling compound such as a petroleum based hot melt filling compound. At least 50% of the outer surface area of the buffer tube 12 is covered by the radial strength yarns 16. Corrugated steel armor 18 may be applied over the radial strength yarns 16 and the corrugated steel armor 20 is flooded with a water blockable flooding compound such as petroleum based hot melt filling compound manufactured by Witco Corporation, New York, N.Y. or Amoco Chemical Company, Chicago, or a petroleum based flooding compound. Alternatively, water swellable yarns or tapes may be used for water blocking. A high strength rip cord 20 is applied under the armor 20 to aid with sheath removal. Two strength members 22 are located 180 degrees apart on the outside of the corrugated armor 18. The strength members 22 may be fabricated from steel or fiber reinforced plastics. An outer jacket 24 encapsulates the strength members 22 and corrugated armor 10 to complete the structure. The outer jacket 2, may be made from a polyolefin material having a high MFI. The water blockable flooding compound (not shown) is disposed between the corrugated armor 18 and the outer jacket 24. Water swellable yarns or tapes may be used to replace the flooding compound, if desired.

The present invention can also be applied to loose tube optical fiber cables having single or multi-layer buffer tubes. FIG. 7 illustrates a reversing helically wound loose tube optical fiber cable 202. The cable 102 shown in FIG. 2 generally comprises a central strength member 104 surrounded by a plurality buffer tubes 105 through 112 and a filler rod 114. Each of the buffer tubes 106–112 may house loose optical fibers 226 or optical fiber ribbons and each of the buffer tubes 206–112 may be formed from a single layer of material or multiple layers of material. Cable 102 further comprises armoring 118, and a protective outer jacket 120, among other things. The buffer tubes 106–112 and the filler rod 114, for example, are fabricated from polyolefin material having a high MFI according to the present invention. In embodiments where multi-layer buffer tubes are utilized, at least one of the layers of the multi-layer buffer is fabricated from the polyolefin material having a high MFI according to the present invention.

In addition to the above applications, the present invention can be applied to slotted core type optical fiber cables. Referring to FIG. 8, there is shown a typical slotted core type optical fiber cable 202. The cable 202 includes a central strength member 204 that is surrounded by a slotted core member 206. The slotted core member 206 contains a plurality of helical grooves or slots 200. The slots 200 provide protective guides for optical fibers 210 which lay in the slots in a stress-free state. The slotted core member 206 is fabricated from a polyolefin material having a high MFI in accordance with the present invention.

It should be appreciated by those skilled in the art that the materials with a high MFI may also offer advantages when used in cable designs or structures which are not explicitly mentioned in this disclosure. It can be seen from the foregoing disclosure and series of examples that the present invention offers a method for producing optical fiber cable components which offers substantial advantages over the prior art. For the linespeeds investigated, which include speeds from 25 to 150 M/min., materials with MFI in the range of about 4 to 6 and above were found to give the best combination of processability and physical properties, but for higher linespeeds, materials with higher MFI may be optimal. Compared to cable components produced using materials with a low melt flow range, which is common practice in the extrusion industry, the choice of a higher melt flow polyolefin material with MFI of about 3 or greater provides advantages in both processability and physical properties in the final product. These advantages include, but are not limited to, reduction of viscous heating during extrusion, increased extruder output, increased linespeeds, more rapid crystallization, higher ultimate crystallinity, increased solvent resistance and gel compatibility, improved crush resistance, and reduced post extrusion shrinkage. It is to be understood that the embodiments described herein are merely illustrative of the principles of the invention. Various modifications may be made thereto by persons skilled in the art which will embody the principles of the invention and fall within the spirit and scope thereof. Hence, the present invention is deemed limited only by the appended claims and the reasonable interpretation thereof.

What is claimed is:

1. An optical fiber cable component extruded from a polyolefin material having a Melt Flow Index (MFI) above about 3 and containing about 0.05 to 1 weight percent of a nucleating agent by weight.

2. The optical fiber cable component as described in claim 1, wherein the MFI is in the range of about 4 to 10.

3. The optical fiber cable component as described in claim 1, wherein the polyolefin material is a copolymer of polypropylene and ethylene.

4. The optical fiber cable component as described in claim 3, wherein the copolymer contains approximately 2–14% ethylene monomer by weight.

5. The optical fiber cable component as described in claim 3, wherein the copolymer contains less than approximately 2% ethylene monomer by weight.

6. The optical fiber cable component as described in claim 3, wherein the copolymer contains greater than approximately 14% ethylene monomer by weight.

7. The optical fiber cable component as described in claim 1, wherein the polyolefin material is a homopolymer of polypropylene.

8. The optical fiber cable component as described by claim 7, wherein the polypropylene homopolymer has a polymer chain microstructure that is predominately isotactic.

9. The optical fiber cable component as described by claim 1, wherein the polyolefin material is a homopolymer of polyethylene.

10. The optical fiber cable component as described by claim 9, where the homopolymer is selected from the group consisting of high density polyethylene, medium density polyethylene, low density polyethylene, and LLDPE.

11. The optical fiber cable component as described by claim 1, wherein the polyolefin material is a terpolymer comprising propylene and ethylene monomers.

12. The optical fiber cable component as described in claim 1, wherein the nucleating agent dispersed in the polyolefin material is; selected from the group consisting of a salt of an aliphatic monobasic acid, a salt of an aliphatic dibasic acid and a salt of an arylalkyl acid.

13. The optical fiber cable component as described in claim 12, wherein the nucleating agent is further selected from the group consisting of sodium succinate, sodium gluterate, and sodium caproate.

14. The optical fiber cable component as described in claim 1, wherein the nucleating agent dispersed in the polyolefin material is selected from the group consisting of an alkali metal salt of an aromatic carboxylic acid, an aluminum salt of an aromatic carboxylic acid, an alkali metal salt of an alicyclic carboxylic acid and an aluminum salt of an alicylic carboxylic acid.

15. The optical fiber cable component as described in claim 14, wherein the nucleating agent is further selected from the group consisting of sodium benzoate, sodium stearate, and potassium benzoate.

16. The optical fiber cable component as described in claim 1, wherein the component is foamed by use of a chemical blowing agent.

17. The optical fiber cable component as described in claim 1, wherein the material is reinforced by a filler selected from the group consisting of talc, calcium carbonate, carbon black, mica, silica, and kaolin.

18. The optical fiber cable component as described in claim 1, wherein the component is a buffer tube.

19. The optical fiber cable component as described in claim 1, wherein the component is a multi-layer buffer tube and wherein at least one of the layers is formed from the polyolefin material.

20. The optical fiber cable component as described in claim 1, wherein the component is a filler rod.

21. The optical fiber cable component as described in claim 1, wherein the component is a jacket.

22. The optical fiber cable component as described in claim 1, wherein the component is specified as a slotted core.

23. An optical fiber cable component extruded from a copolymer of propylene and ethylene having an MFI in the range of about 3 to 10 and having approximately 0.05 to 1 weight percent of a nucleating agent disbursed therein.

24. The optical fiber cable component as described in claim 23, wherein the component is a buffer tube.

25. The optical fiber cable component as described in claim 23, wherein the component is a filler rod.

* * * * *

UNITED STATES PATENT AND TRADEMARK OFFICE
CERTIFICATE OF CORRECTION

| | |
|---|---|
| PATENT NO. : 5,911,023 | Page 1 of 2 |
| DATED : June 8, 1999 | |
| INVENTOR(S) : Brian G. Risch, James D. Holder | |

It is certified that error appears in the above-identified patent and that said Letters Patent is hereby corrected as shown below:

Column 8:
Line 66, please delete "lower MFI" and insert therefor --higher MFI--.

Drawing Sheet 2 of 4, FIG. 3:
Please delete "CHRYSTALLINITY" and insert therefor --CRYSTALLINITY--.
See attached drawing sheet replacement.

Drawing Sheet 2 of 4, FIG. 4:
The last three bars on the graph should be marked with a linespeed of
--150M/MIN--, not "30M/MIN". See attached drawing sheet replacement.

Signed and Sealed this

Thirty first Day of July, 2001

*Attest:*

*Attesting Officer*

NICHOLAS P. GODICI
*Acting Director of the United States Patent and Trademark Office*